Jan. 7, 1936.                R. L. KIMBALL                2,027,234
                             SYSTEM OF CONTROL
                           Filed March 15, 1934
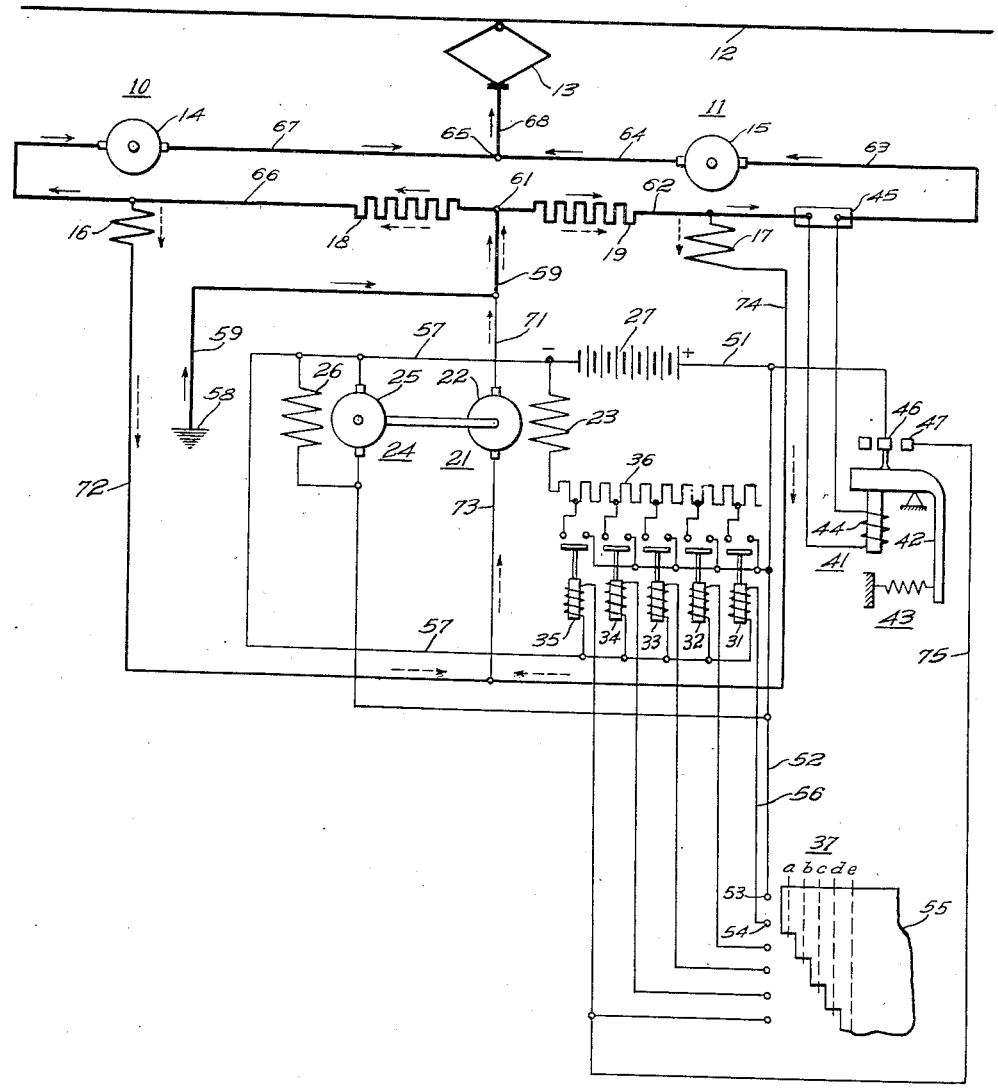
WITNESSES:                                              INVENTOR
                                                    Richard L. Kimball.
                                                            BY
                                                         ATTORNEY Patented Jan. 7, 1936

2,027,234

UNITED STATES PATENT OFFICE 2,027,234

SYSTEM OF CONTROL

Richard L. Kimball, Forest Hills, Pa., assignor to Westinghouse Electric & Manufacturing Company, East Pittsburgh, Pa., a corporation of Pennsylvania Application March 15, 1934, Serial No. 715,626

7 Claims. (Cl. 172—179)

My invention relates to systems of control for dynamo-electric machines and particularly to the excitation and control of electric railway motors during regenerative operation.

In previously known systems of control, the establishment of connections for regeneration requires the adjusting of the voltage generated by the traction motors to be equal to the line voltage. This has been accomplished, either by separately exciting the field windings of the traction motors with the motors disconnected from the line and so adjusting the voltage of the motors that it equals the line voltage before connecting them to the line, or by allowing current to flow through the motors in the normal motoring direction and measuring the voltage drop across the motor fields. The voltage of the exciter for exciting the field windings during regeneration is adjusted to equal the voltage across the field windings and the motor connections then changed from motoring operation to separately-excited regeneration. Both of these schemes require two controlling agencies which must be manipulated by the operator of the locomotive, one to establish the equality of the motor and the line potentials, and the other to change the motor connections, and both schemes depend upon the skill of the operator for their proper functioning.

If insufficient excitation is provided to correspond with the locomotive speed at the time the motors are connected to the line, a heavy rush of motoring current is produced which may be sufficient to operate the overload protective apparatus on the locomotive or in the power substation, thereby disconnecting the motors from the power source and permitting the train to get out of control. On the other hand, if the excitation is too great when the motors are connected to the line, the generated voltage will cause an excessive rush of regenerated current which produces a sudden shock to the train. Furthermore, if the operator is unable to establish the balanced condition for a considerable time and delays in making the proper connections for regenerative braking, the speed of the train may increase to a dangerous value during this time interval.

An object of my invention, generally stated, is to provide a system for controlling electric motors during the establishment of regenerative operation which shall be simple to operate and which may be readily and economically manufactured and installed.

A further object of my invention is to provide a system of control which will insure a high degree of safety of operation during the change from motoring or coasting to regenerative operation of the traction motors of an electric locomotive or vehicle.

A still further object of my invention is to provide a regenerative control system which may be safely operated without requiring special skill or training of the operator.

Other objects of my invention will be explained fully hereinafter or will be apparent to those skilled in the art.

According to the preferred embodiment of my invention, the traction motors are separately excited from an independent source and are immediately connected to the line when it is desired to establish regeneration. The excitation is automatically controlled by a relay to hold the regenerated current at a predetermined minimum value until manual control is assumed by the operator.

For a fuller understanding of the nature and objects of my invention, reference may be had to the following detailed description, taken in conjunction with the accompanying drawing, in which the single figure is a diagrammatic view of a motor control system embodying my invention.

Referring to the drawing, the system shown comprises dynamo-electric machines 10 and 11 which are connected to a trolley conductor 12 through a pantograph collector 13. The machines 10 and 11 have commutator-type armatures 14 and 15, and field windings 16 and 17, respectively. Stabilizing resistors 18 and 19 are associated with the main machine circuits in a manner which will be more fully described hereinafter. An auxiliary generator or exciter 21 having an armature 22 and a field winding 23, is provided for exciting the field windings 16 and 17 during regeneration. The generator 21 is driven by a motor 24, having an armature 25 and a shunt field winding 26 or by other suitable means. A battery 27 is provided for energizing the motor 24 and the field winding 23 of the exciter 21. The battery 27 also energizes the actuating coils of a plurality of switches 31 to 35, inclusive, which shunt a resistor 36 to control the excitation of the field winding 23. A master controller 37, only a portion of which is shown, may be utilized to control the operation of the machines 10 and 11, both when they are operating as motors and also when they are operating as generators during regeneration.

In order that the excitation of the machines 10 and 11 may be automatically controlled when the regenerative connections are established, a relay 41 is provided for regulating the current in the field winding 23 of the exciter 21, thereby governing its voltage, which controls the excitation of the machines 10 and 11 and, therefore, controls the amount of regenerated current and the braking effect produced. As shown, the relay 41 is of a sensitive type, having a counter-balanced armature member 42 capable of operating rapidly. A spring 43 is provided for opposing the pull of an actuating coil 44 which is energized by means of a shunt 45, connected in the main circuit of the machine 11. The relay 41 may be of a polarized or directional type so constructed that, when the regenerated current is below a predetermined value or when the machines 10 and 11 are acting as motors, the spring 43 will cause the relay 41 to close its contact members 46 and 47 and that these contact members will be opened when the regenerated current is above a predetermined value. Therefore, the relay 41 may be utilized to maintain the regenerated current at a predetermined value, as will be more fully described hereinafter.

There are various methods, which are well known in the art, of controlling the operation of dynamo-electric machines when they are operating as motors to propel a locomotive and also of changing the machine connections from motoring to regenerative operation; therefore, it is believed to be unnecessary to illustrate and describe the machine connections for motoring operation in the present application.

Assuming that the various machines are to be connected as shown for regenerative operation, which, as stated hereinbefore, may be safely and rapidly done by utilizing the invention herein described. When the master controller 37 is actuated to position "a" it will be seen that an energizing circuit is established for the actuating coil of the switch 31. This circuit may be traced from the positive terminal of the battery 27 through conductors 51 and 52, contact fingers 53 and 54, bridged by the contact segment 55, conductor 56, the actuating coil of the switch 31 and conductor 57 to the negative terminal of the battery 27. The switch 31 is thereby closed to connect the field winding 23 of the exciter 21 across the battery 27, the entire resistor 36 being connected in series with the field winding 23 to limit the amount of current permitted to flow through the winding. The motor armatures can be connected to the line, as shown, when controlled by my scheme without danger of current surges of dangerous magnitude or of shocks to the train.

As shown, the main circuits for regenerative operation are established from the ground point 58 through conductor 59 to a junction point 61, where the circuit divides, one branch extending through the stabilizing resistor 19, conductor 62, the shunt 45, conductor 63, the armature 15 and conductor 64 to a junction point 65; the other branch extends from the junction point 61 through the stabilizing resistor 18, conductor 66, the armature 14, and conductor 67 to the junction point 65, thence through a conductor 68 and the pantograph 13 to the trolley conductor 12.

When the field winding 23 of the exciter 21 is energized, an excitation current will be caused to flow through the field windings 16 and 17 of the main machines 10 and 11. The excitation circuits may be traced from one terminal of the armature 22 through conductors 71 and 59 to the junction point 61 where this circuit divides, one branch extending through the balancing resistor 18, conductor 66, the field winding 16, and conductors 72 and 73 to the other terminal of the armature 22; the other branch extending from the junction point 61 through the balancing resistor 19, conductor 62, the field winding 17 and conductors 74 and 73 to the terminal of the armature 22. The direction of flow of the excitation current is indicated on the drawing by dotted arrows.

As previously stated, in order to cause a regenerated current to flow into the power system it is necessary that the excitation of the machines 10 and 11 be sufficient to cause these machines to generate a voltage higher than the line voltage. It will be understood that the voltage generated by the machines 10 and 11 depends upon the speed at which they are operating and the excitation current flowing through their field windings. If the machine voltage is above the line voltage, a regenerated current will flow through the main circuits, previously traced, from the ground point 58 to the trolley conductor 12 in the direction indicated by the solid arrows. However, if the voltage generater by the machines 10 and 11 is below the line voltage, current will flow through the machines from the trolley conductor 12 to the ground point 58, thereby causing the machines to operate as motors.

It will be understood that if the machines fail to regenerate any current the excitation of the main machines 10 and 11 may be increased, thereby causing them to generate a voltage higher than the line voltage. By increasing the excitation current through the field winding 23 of the exciter 21 the exciter voltage will be raised, thereby increasing the excitation current through the field windings 16 and 17 of the main machines 10 and 11. It is apparent that the excitation current through the field winding 23 may be increased by shunting the resistor 36 from the field winding circuit. The resistor 36 may be shunted step-by-step by closing the switches 32 to 35, inclusive, by actuating the master controller 37 from position "a" through positions "b", "c", "d" and "e".

However, as stated hereinbefore, it is exceedingly difficult for the operator to manually operate the controller 37 to provide the right amount of excitation current in the field winding 23 to balance the voltage of the machines 10 and 11 against the line voltage, therefore I have provided the relay 41 to automatically regulate the excitation of the exciter 21 to maintain a predetermined value of regenerated current, while the operator is manipulating the controller 37 to secure the desired braking effect.

As stated hereinbefore, if the regenerated current is below a predetermined value, or in case current is flowing in the motoring direction, the spring 43 will operate the relay 41 to close its contact members 46 and 47, which energizes the actuating coil of the switch 35 through a circuit which extends from the positive terminal of the battery 27 through conductor 51, the contact members 46 and 47, conductor 75, the actuating coil of the switch 35, and conductor 57 to the negative terminal of the battery 27.

The closing of the switch 35 shunts the entire resistor 36 from the circuit through the field winding 23, thereby applying maximum excitation to the exciter 21, which will cause the machines 10 and 11 to produce a heavy regenerated current if the maximum excitation condition is allowed to continue. However, as soon as the regenerated current exceeds a predetermined value, the actuating coil 44 of the relay 41 will operate the relay to open its contact members 46 and 47, thereby deenergizing the switch 35 which inserts the resistor 36 in the circuit for the field winding 23 and the cycle is repeated.

As stated hereinbefore, the relay 41 is of the counter-balanced type and is capable of rapid operation; therefore, it functions to so control the excitation of the machines 10 and 11 that a predetermined value of regenerated current is maintained until the operator advances the controller 37 to a position which will produce a steady excitation corresponding to the average provided by the relay, whereupon the automatic control ceases and the operation becomes entirely manual under the control of the operator. When the controller is advanced to some position, as for instance position "c", in which case the switch 33 is closed, the regenerated current will be of such a value that the contact members of the relay 41 will be held open by the actuating coil 44, thereby removing the automatic control.

If the operator desires to increase the regenerated current to further increase the braking effect, this may be accomplished by actuating the master controller 37 to cause an additional portion of the resistor 36 to be shunted from the circuit of the field winding 23, which will raise the voltage of the exciter 21 and further increase the excitation of the machines 10 and 11.

When the system is under manual control, it is inherently self-regulating and stable in its regenerative operation, because of the effect of the stabilizing grid resistors 18 and 19. As indicated by the solid arrows, representing regenerated current, and the dotted arrows, denoting main exciting current, both of these currents traverse the stabilizing resistors 18 and 19 in the same direction. Consequently, upon a sudden increase in the regenerated current, which might result from a sudden drop in the line voltage, the voltage drop across the stabilizing resistors 18 and 19 is increased, which tends to reduce the amount of excitation current permitted to flow through the field winding circuits of the main machines, thereby reducing the regenerated current. The converse action takes place in the event of a sudden decrease of the regenerated current. In this way, a substantially constant current is returned to the supply circuit, irrespective of voltage fluctuations thereof.

From the foregoing description, it is evident that I have provided a system of regenerative control which affords a greater degree of safety of operation at the time of commencing regeneration than previously known systems, since the regenerative connections may be immediately established without the delay resulting from the operator attempting to manually obtain the balanced conditions of machine and line voltage. In the present system, the regenerated current is automatically regulated at a predetermined value while the operator is manipulating the controller to assume manual control. A further advantage of the present system is that only one controller is required for controlling the operation of the machines, both during acceleration and regeneration, which simplifies the control system and its operation.

I do not desire to be restricted to the particular form or arrangement of parts herein shown and described, since it is evident that they may be changed and modified without departing from the spirit and scope of my invention as defined in the appended claims.

I claim as my invention:

1. In a system of control, the combination with a supply circuit and a main dynamo-electric machine adapted to regenerate current into the supply circuit and having an armature and a field winding, of auxiliary means for separately exciting the field winding during regeneration, relay means mainly responsive to the regenerated current for controlling the voltage of said auxiliary means, thereby controlling the excitation of the field winding to regulate the regenerated current, and a controller for controlling the voltage of the auxiliary means independently of said relay means when the regenerated current is above a predetermined value.

2. In a system of control, the combination with a supply circuit and a main dynamo-electric machine adapted to regenerate current into the supply circuit and having an armature and a field winding, of means for separately exciting the field winding during regeneration, relay means mainly responsive to the regenerated current for controlling the excitation of the field winding to regulate the regenerated current, and a manually operable controller for controlling the regenerated current independently of said relay means when it exceeds a predetermined value.

3. In a system of control, the combination with a supply circuit and a main dynamo-electric machine adapted to regenerate current into the supply circuit and having an armature and a field winding, of means for separately exciting the field winding during regeneration, relay means mainly responsive to the regenerated current for controlling the excitation of the field winding to regulate the regenerated current, and a manually operable controller for permitting the operator to assume control of the excitation of the field winding independently of said relay means when the regenerated current is above a predetermined value.

4. In a system of control, the combination with a supply circuit and a main dynamo-electric machine adapted to regenerate current into the supply circuit and having an armature and a field winding, of an auxiliary generator for exciting the field winding of the main machine, means for driving the auxiliary generator, regulating means mainly responsive to the regenerated current for controlling the voltage of the auxiliary generator, thereby controlling the excitation of the main machine and regulating the amount of regenerated current, and a controller for controlling the voltage of the auxiliary generator independently of the regulating means when the regenerated current is above a predetermined value.

5. In a system of control, the combination with a supply circuit and a main dynamo-electric machine adapted to regenerate current into the supply circuit and having an armature and a field winding, of an auxiliary generator for exciting the field winding of the main machine, means for driving the auxiliary generator, regulating means mainly responsive to the regenerated current for controlling the excitation of the main machine, thereby regulating the amount of regenerated current, and a controller disposed to permit the operator to assume control of the excitation of the main machines independently of said regulating means when the regenerated current is above a predetermined value.

6. In a system of control, the combination with a supply circuit and a main dynamo-electric machine adapted to regenerate current into the supply circuit and having an armature and a field winding, of an auxiliary generator for exciting the field winding of the main machine, the auxiliary generator having an armature and a field winding, means for driving the auxiliary generator, means for separately exciting the field winding of the auxiliary generator, regulating means mainly responsive to the regenerated current for controlling the excitation current in the field winding of the auxiliary generator, thereby controlling the excitation of the main machine and the amount of regenerated current, and means for controlling said excitation current independently of the regulating means when the regenerated current is above a predetermined value.

7. In a system of control, the combination with a supply circuit and a main dynamo-electric machine adapted to regenerate current into the supply circuit and having an armature and a field winding, of an auxiliary generator for exciting the field winding of the main machine, the auxiliary generator having an armature and a field winding, means for driving the auxiliary generator, means for separately exciting the field winding of the auxiliary generator, regulating means mainly responsive to the regenerated current for controlling the excitation current in the field winding of the auxiliary generator, thereby controlling the excitation of the main machine and the amount of regenerated current, and a manually operable controller disposed to permit the operator to govern the regenerated current independently of the regulating means when it is above a predetermined value.

RICHARD L. KIMBALL.